(12) United States Patent
Aprile et al.

(10) Patent No.: US 8,078,052 B2
(45) Date of Patent: Dec. 13, 2011

(54) PROTOCOL-LESS ALL-OPTICAL 1+1 BIDIRECTIONAL REVERTIVE LINEAR PROTECTION SYSTEM

(75) Inventors: Aldo Aprile, Milan (IT); Valerio Viscardi, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 777 days.

(21) Appl. No.: 11/874,678

(22) Filed: Oct. 18, 2007

(65) Prior Publication Data

US 2009/0103915 A1     Apr. 23, 2009

(51) Int. Cl.
*H04B 10/00* (2006.01)

(52) U.S. Cl. ............ 398/15; 398/10; 398/13; 398/16; 398/17

(58) Field of Classification Search .......... 398/1–38
See application file for complete search history.

(56) References Cited

U.S. PATENT DOCUMENTS

| | | | | |
|---|---|---|---|---|
| 5,559,622 A * | 9/1996 | Huber et al. | ......................... | 398/5 |
| 5,615,033 A * | 3/1997 | Yoshida et al. | ................. | 398/15 |
| 5,712,847 A * | 1/1998 | Hata | ............................. | 370/228 |
| 5,875,048 A * | 2/1999 | Nemecek et al. | ............. | 398/194 |
| 6,038,211 A * | 3/2000 | Lemaire | ........................ | 370/216 |
| 6,115,154 A * | 9/2000 | Antoniades et al. | ............. | 398/4 |
| 6,137,603 A * | 10/2000 | Henmi | ............................. | 398/4 |
| 6,266,168 B1 * | 7/2001 | Denkin et al. | .................... | 398/5 |
| 6,614,753 B2 * | 9/2003 | Ikawa | ............................. | 370/222 |
| 6,731,879 B1 * | 5/2004 | Frisch et al. | ................... | 398/104 |
| 6,898,376 B1 * | 5/2005 | Gerstel et al. | ..................... | 398/5 |
| 7,046,928 B1 * | 5/2006 | Bradford et al. | .................. | 398/9 |
| 7,174,096 B2 * | 2/2007 | Berthold et al. | .................. | 398/5 |
| 7,391,971 B2 * | 6/2008 | McCloskey et al. | ............ | 398/38 |
| 7,409,154 B2 * | 8/2008 | Wellen | ............................. | 398/19 |
| 7,430,373 B2 * | 9/2008 | Yamashita | ...................... | 398/83 |
| 7,561,799 B2 * | 7/2009 | Togawa et al. | .................. | 398/45 |
| 7,729,613 B2 * | 6/2010 | Lauder | ............................ | 398/15 |
| 2007/0065149 A1 * | 3/2007 | Stevens et al. | .................. | 398/45 |
| 2007/0140688 A1 * | 6/2007 | Patel et al. | ......................... | 398/5 |

* cited by examiner

*Primary Examiner* — Agustin Bello (57) ABSTRACT

In an optical network a 1+1 bidirectional protection system is presented. Each node across a link has photodiodes to monitor the power of signals received by the node on receiving working and protection optical fibers and also optical switches connected to transmission working and protection optical fibers to modulate signals to its counterpart node across the link. When a node detects a fault in the receiving working optical fiber, not only does the node switch to the receiving protection optical fiber, but it also switches to the transmission protection optical fiber to signal the fault to the node across the link. The optical switches on transmission working and protection optical fibers allow the two nodes across the link to signal each other at a protocol-less or primary protocol level for the link to revert back to its initial state.

18 Claims, 12 Drawing Sheets

PROTOCOL-LESS ALL-OPTICAL 1+1 BIDIRECTIONAL REVERTIVE LINEAR PROTECTION SYSTEM

BACKGROUND OF THE INVENTION

The present invention is generally related to optical networks and, more particularly, to signal traffic protection in linear optical networks.

Optical networks conventionally compensate for deleterious linear effects to maintain the integrity of signals sent over the optical fibers of the network. To protect the integrity of signal traffic carried on the operative link carrying the signals against interruption or failure, e.g., a line cut, protection optical fibers are invoked. The signal traffic is switched from an interrupted working optical fiber to a protection optical fiber. In many arrangements the operative link reverts back to the working optical fiber once it is repaired.

In a link having 1+1 protection, the link has at least four optical fibers, one pair (working and protection) for carrying optical signals in one direction and a second pair (working and protection) for carrying optical signals in the opposite direction. The transmitting node sends the network optical signals on both the working optical fiber and a protection optical fiber. The receiving node accepts the optical signals on the working optical fiber but switches to the protection optical fiber upon detection of a fault in the working optical fiber.

Conventionally protection arrangements such as described use a protection switching protocol after the conversion of the optical signals into electrical signals. This protection switching protocol is performed in the upper layers of the optical network architecture. For example, many optical networks use SONET/SDH (Synchronous Optical NETwork/Synchronous Digital Hierarchy) protocol. This protocol operates above the physical layer, the lowest layer defined in the oftentaught OSI (Open Systems Interconnection) model. Such networks often use the high level SONET/SDH protocol in the network's protection system, typically a 1+1 protection system.

Such high level protocols for the two nodes of a link require relatively complex information exchanges between the two nodes. It is desirable that the requirements of such protection be simplified.

DETAILED DESCRIPTION OF THE INVENTION

One aspect of the present invention provides for nodes in an optical network having a link carrying network optical signals in one direction and carrying network optical signals in an opposite direction with 1+1 protection in each direction. Each node for the link has an optical splitter having an input terminal for receiving network optical signals to transmit across the link, a first output terminal and a second output terminal; a first optical modulator connected between the first optical splitter output terminal and a first terminal for connection to a first transmission optical fiber for carrying the network optical signals across the link in one direction; a second optical modulator connected between the second optical splitter output terminal and a second terminal for connection to a second transmission optical fiber for carrying the network optical signals across the link in the one direction; a receiving optical switch having an output terminal for transmitting network optical signals, a first input terminal for receiving the network optical signals from a first receiving optical fiber for carrying across the link in the opposite direction, and a second input terminal for receiving the network optical signals from a second receiving optical fiber across the link in the opposite direction; a first photodiode coupled to the first input terminal of the third optical switch; and a second photodiode coupled to the second input terminal of the third optical switch. The first and second optical modulators and the receiving optical switch operate at a primary protocol level to allow the link to revert back to a original state upon a failure and repair of one of the receiving optical fibers.

In another aspect of the present invention, a method of operating a local node connected to a remote node by a link with a 1+1 protection is provided. The local node has a transmission port connected to a first transmission optical fiber and a second transmission optical fiber of to a remote node by a link with a 1+1 protection link and a reception port connected to a first receiving optical fiber and a second receiving optical fiber of to a remote node by a link with a 1+1 protection link. The method comprises: receiving signals on the first receiving optical fiber from the remote node; sending optical signals to the remote node on the first and second transmission optical fibers; detecting a failure on the first receiving optical fiber; switching to the second receiving optical fiber to receive signals from the remote node; and terminating sending signals on the first transmission optical fiber to the remote node to indicate the failure on the first receiving optical fiber.

Still another aspect of the present invention provides for a node connected to a remote node by a link with a 1+1 protection in an optical network. The node has a transmission port connected to a first transmission optical fiber and a second transmission optical fiber of the link and a reception port connected to a first receiving optical fiber and a second receiving optical fiber of the link. The node comprises: means for receiving signals on the first receiving optical fiber from the remote node; means for sending optical signals to the remote node on the first and second transmission optical fibers; means for detecting a failure on the first receiving optical fiber; means for switching to the second receiving optical fiber to receive signals from the remote node; and means for terminating sending signals on the first transmission optical fiber to the remote node to indicate the failure on the first receiving optical fiber.

Figure 1:
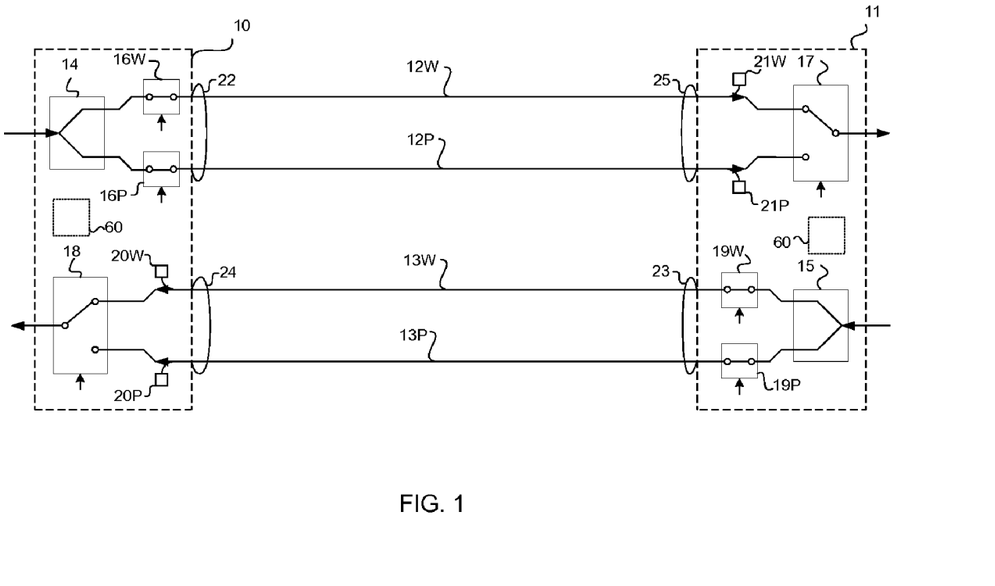
FIG. 1 illustrates a link connecting two nodes organized according to an embodiment of the present invention.

FIG. 1 illustrates a link between two nodes 10 and 11 in an optical network. The node 10 transmits optical signals over a working optical fiber 12W and a protection optical fiber 12P to the node 11. The node 11 in turn transmits optical signals over a working optical fiber 13W and a protection optical fiber 13P to the node 10. The optical network uses 1+1 protection, i.e., each transmitting node 10 (11) splits the transmitted optical signals onto the working and protection optical fibers 12W, 12P (13W, 13P) and the receiving node 11 (10) selects the particular optical fiber 12W, 12P (13W, 13P) from which the optical signals are to be received. Each node 10, 11 has a transmission port 22, 23 and a reception port 24, 25. Each transmission port 22, 23 is connected to its corresponding working optical fiber 12W, 13W and protection optical fiber 12P, 13P, and each reception port 24, 25 is connected to its working optical fiber 13W, 12W and protection optical fiber 13P, 12P respectively.

According to one embodiment of the present invention, each node 10, 11 has an optical splitter 14, 15 which has an input terminal connected to an optical fiber carrying incoming optical signals from another node of the optical network (not shown). The optical splitter 14 (15) splits the optical signals and sends them to two 1×1 optical switches 16W and 16P (19W and 19P), each connected to one of the two output terminals of the splitter 14 (15). The transmitting optical switch 16W (19W) is connected to the working optical fiber 12W (13W) and the transmitting optical switch 16P (19P) is connected to the working optical fiber 12P (13P). The output terminals of the two transmitting switches 16W, 16P (19W, 19P) form the transmission port 22 (23). Alternatively the switches 16W, 16P, 19W, 19P can be VOA (Variable Optical Attenuators) or similar device which can modulate the transmitted optical signals in some fashion. Note that in FIG. 1 all four switches 16W, 16P, 19W, 19P are shown as being closed.

For receiving signals, each node 10 (11) has its input port 24 (25) arranged so that the receiving working optical fiber 13W (12W) and protection optical fiber 13P (12P) are respectively connected to one of the input terminals of a 2×1 receiving optical switch 18 (17). In the node 10 (11) photodiodes 20W, 20P (21W, 21P) connected to the optical switch input terminals respectively verify the state of the optical fibers 13W, 13P (12W, 12P) by monitoring the total power of the signals being sent over the optical fibers 13W, 13P (12W, 12P). The output terminal of the switch 18, 17 is connected to an optical fiber which carries the received optical signals away from the node 10, 11 to another network node (not shown). The operation of the receiving optical switch 18, 17 is controllable, along with optical switches 16W, 16P (19W, 19P); control lines are indicated by an arrow at the bottom of each switch. The control is provided by a control block 60 in each node 10 and 11. The control blocks 60 are described in further detail below.

As shown, the positions of the optical switches 18 and 17 indicate that the link is in a normal state, i.e., each node 10, 11 is receiving optical signals over its respectively connected working optical fiber 13W, 12W.

Figure 2A:
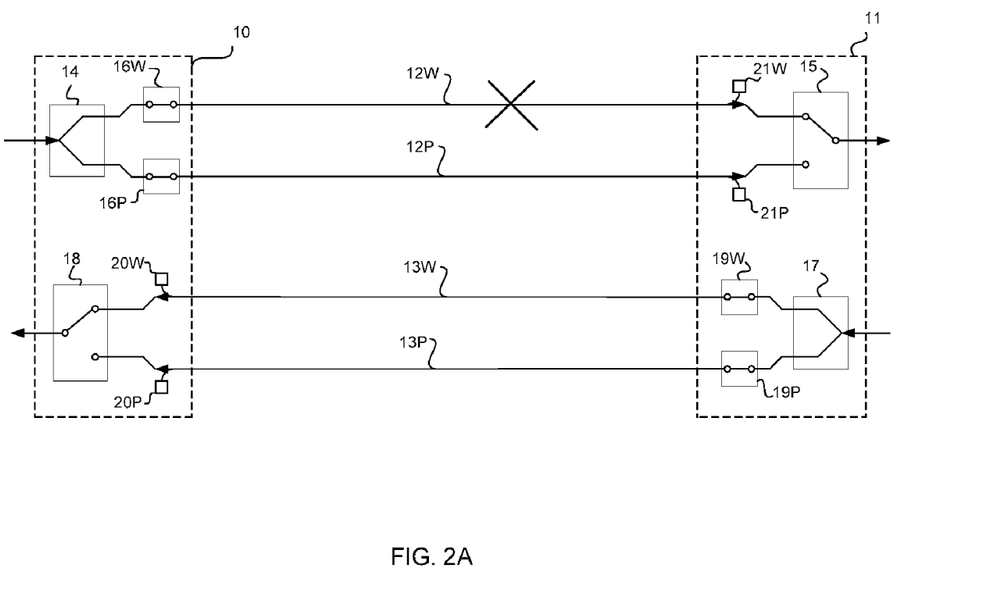
FIGS. 2A-2N illustrates the operation of the FIG. 1 nodes upon an occurrence of a fault in the link, according to an embodiment of the present invention.
Figure 2B:
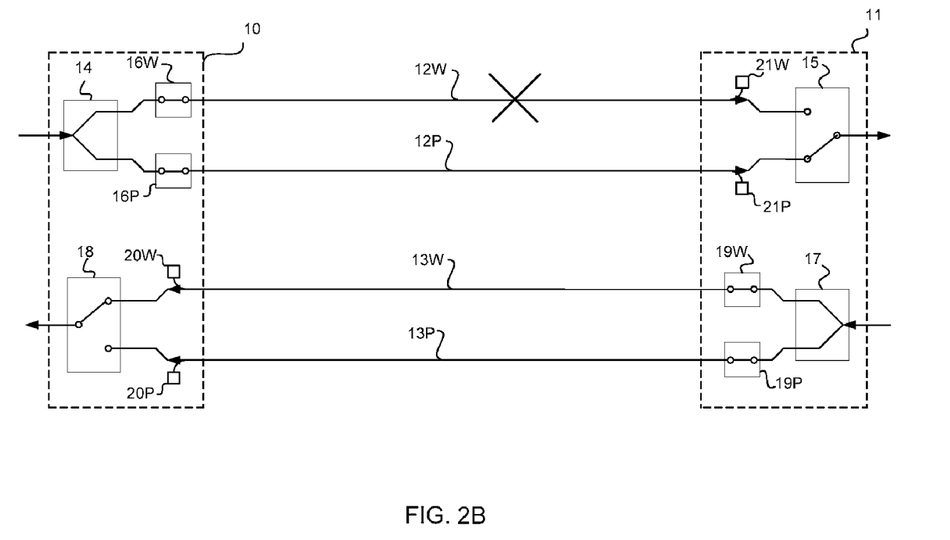

FIGS. 2A-2N illustrate example operation of the nodes operating according to an embodiment of the present invention upon a link failure. FIG. 2A illustrates a failure in one of the optical fibers, here assumed to be the working optical fiber 12W and indicated by the large "X" on the fiber. In accordance with the 1+1 protection mechanism, the receiving node 11 detects the failure by a loss of power on the optical fiber 12W and after a predetermined hold-off time, the receiving optical switch 15 switches to the protection optical fiber 12P. This is shown in FIG. 2B.

Figure 2C:
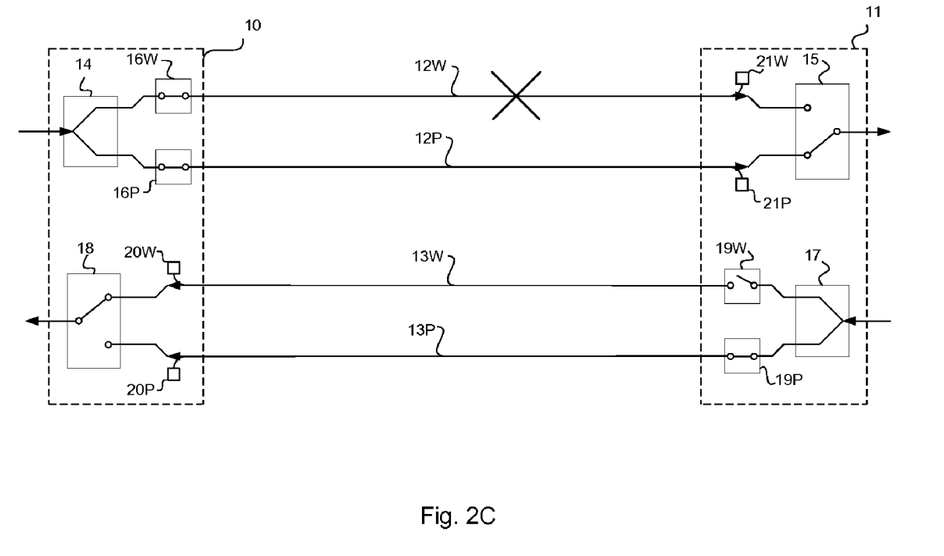
Figure 2D:
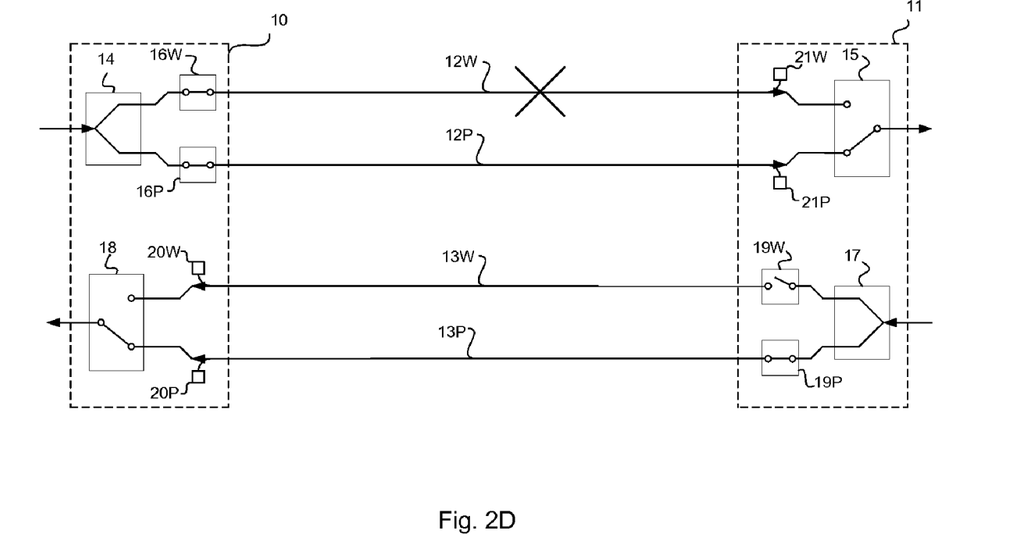
Figure 2E:
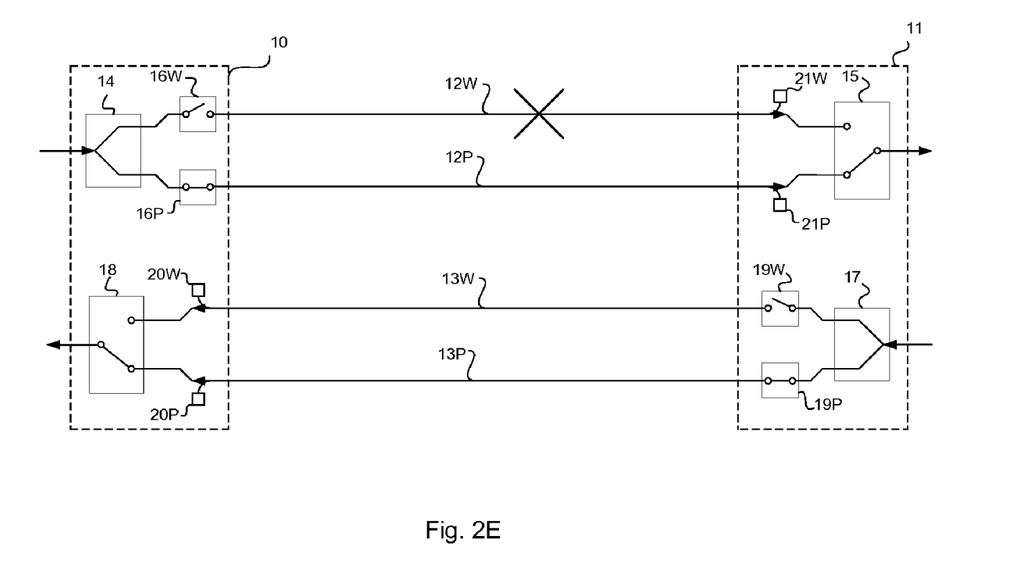

Then, after another delay which is programmable, as shown in FIG. 2C the transmitting switch 19W in the node 11 is opened so that optical signals are no longer transmitted from the node 11 over the working optical fiber 13W to the node 10. Transmitted signals leave the node 11 only on the protection optical fiber 13P. After a hold-off time, this provokes a response in the node 10 which has its receiving optical switch 18 switch to the protection optical fiber 13P, as shown in FIG. 2D. The node 10 now receives optical signals over the protection optical fiber 13P. Optical signals in the link between the two nodes 10, 11 are carried only by the protection optical fibers 12P, 13P. In a manner similar to the opening of switch 19W in node 11, the node 10 opens the transmitting switch 16W after a programmable delay, as illustrated in FIG. 2E.

Figure 2F:
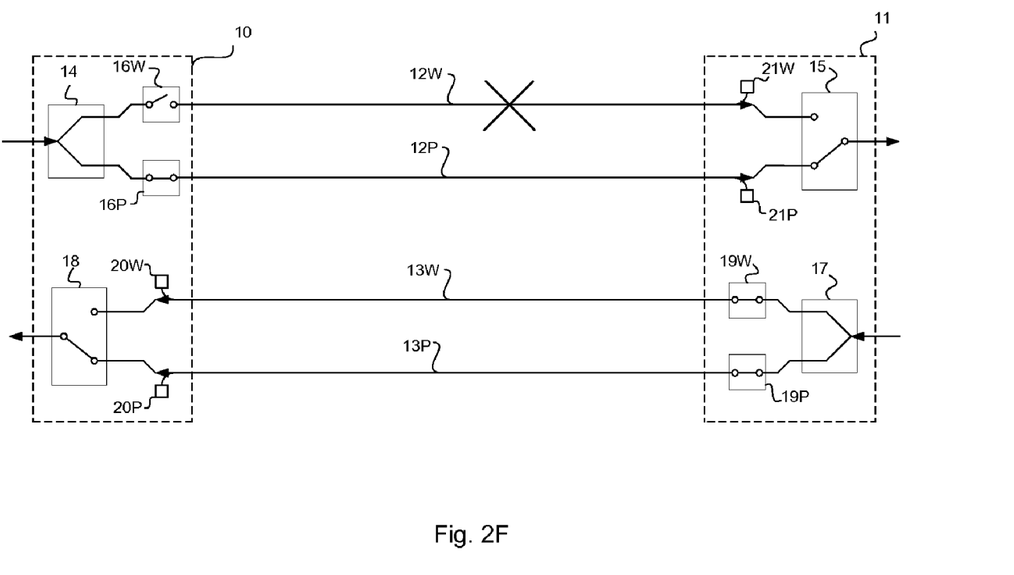
Figure 2G:
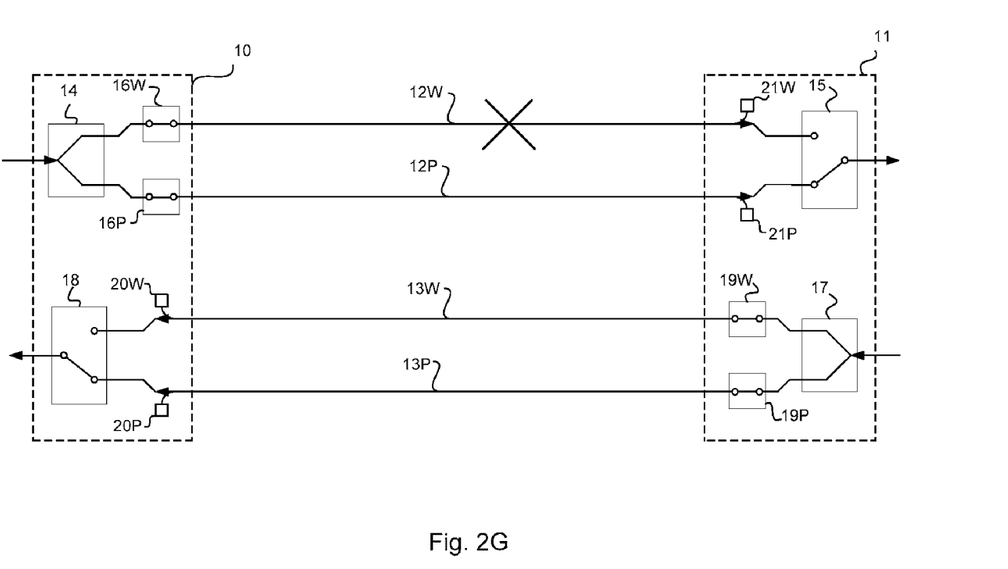
Figure 2H:
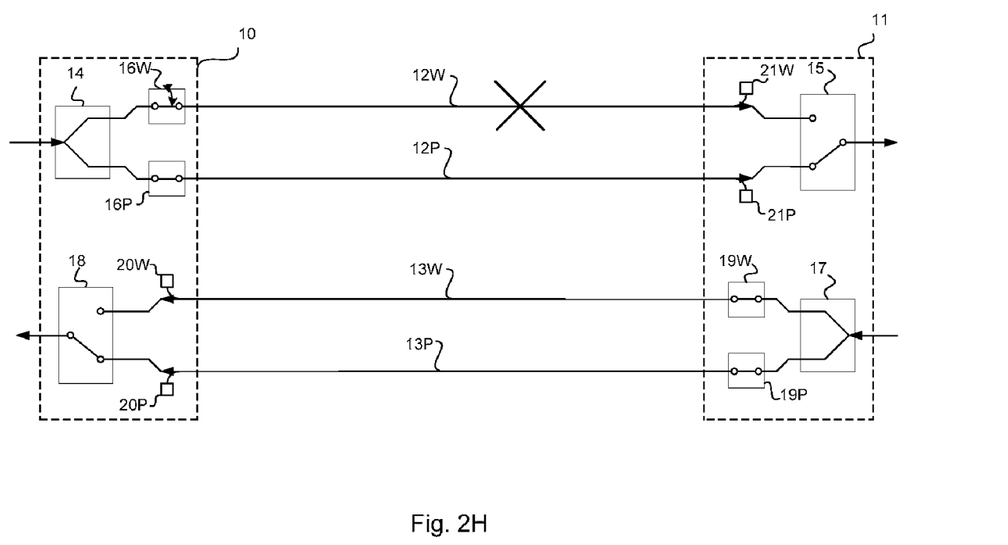
Figure 2I:
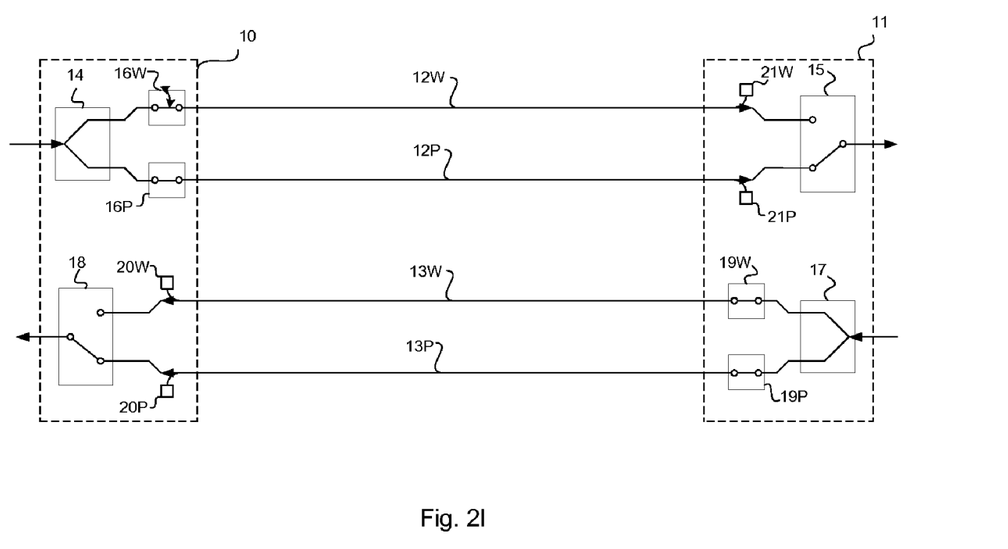

Returning to the node 1 land FIG. 2F, the transmitting switch 19W in the node 11 closes after another programming delay from the opening of the switch 19W. FIG. 2G shows that the node 10 likewise closes its transmitting optical switch 16W after a programmable delay. In response to the power being received over the working optical fiber 13W from the node 11, the transmitting switch 16W in the node 10 begins to open and close, as shown in FIG. 2H. This toggling action as the working optical fiber 12W is repaired, as shown in FIG. 2I.

Figure 2J:
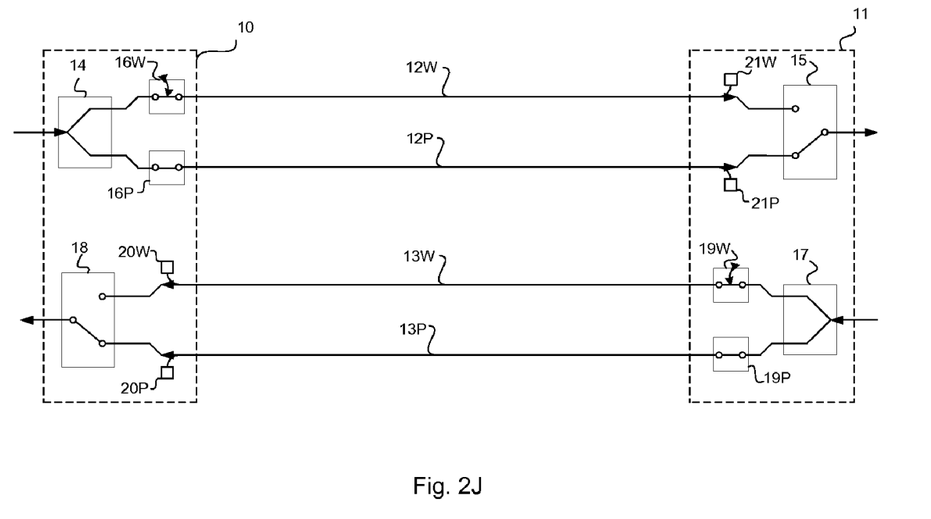
Figure 2K:
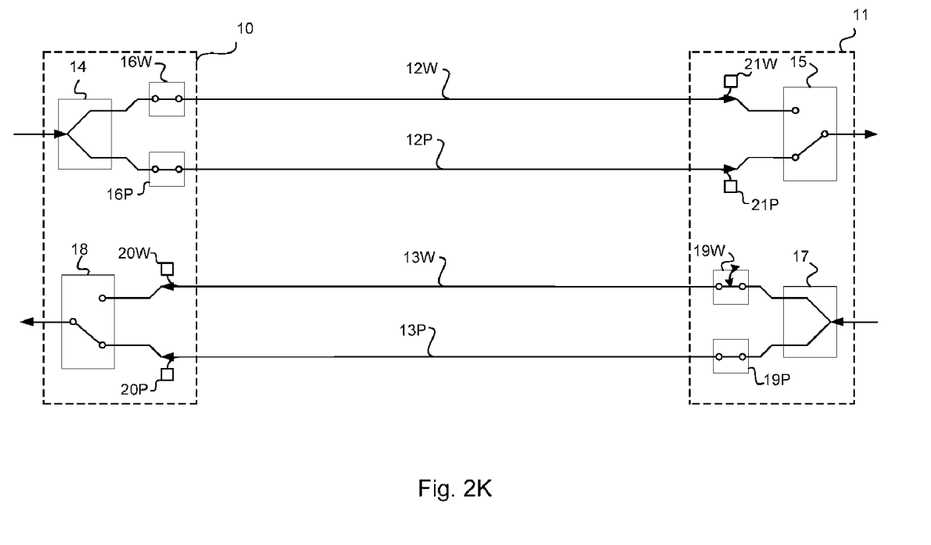
Figure 2L:
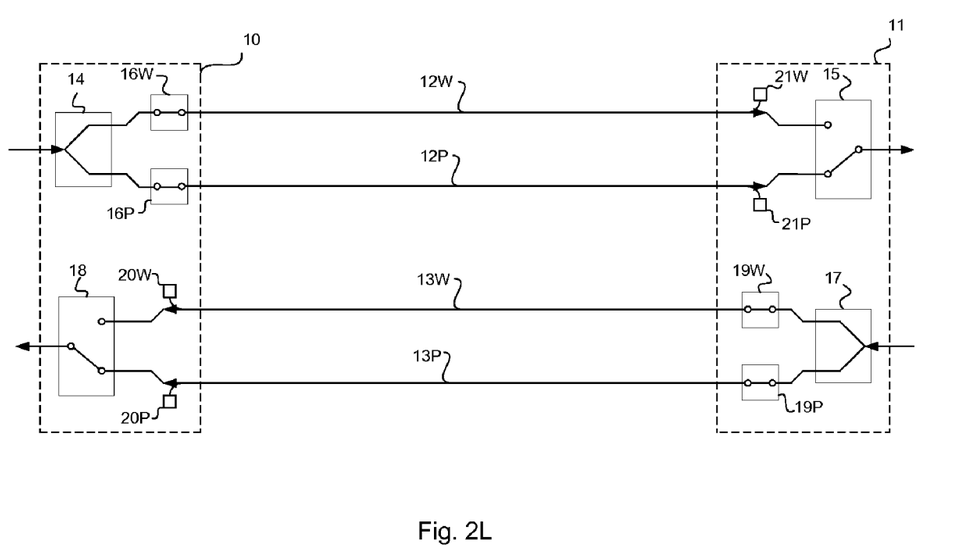

Upon the repair of the working optical fiber 12W, the node 11 now receives the modulated signal on the fiber 12W and FIG. 2J shows the response of the node 11. The transmitting switch 19W in the node 11 begins to open and close so that both working optical fibers 12W and 13W carry the modulated optical signals. In response to the modulated optical signals from the node 11, the node 10 ceases the toggling of the optical switch 16W, as illustrated in FIG. 2K. In response, the node 11 also ceases the toggling of the optical switch 19W, as illustrated in FIG. 2L.

Figure 2M:
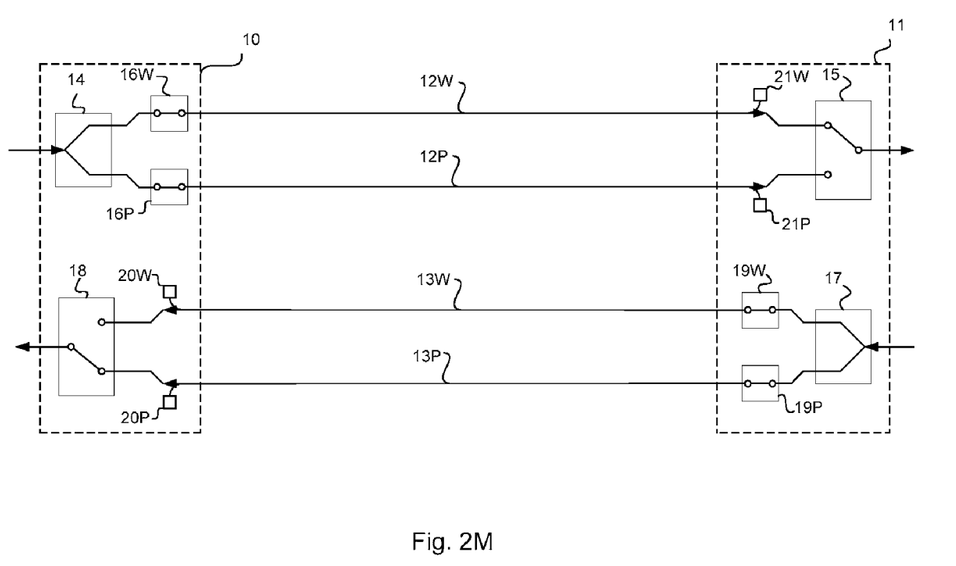
Figure 2N:
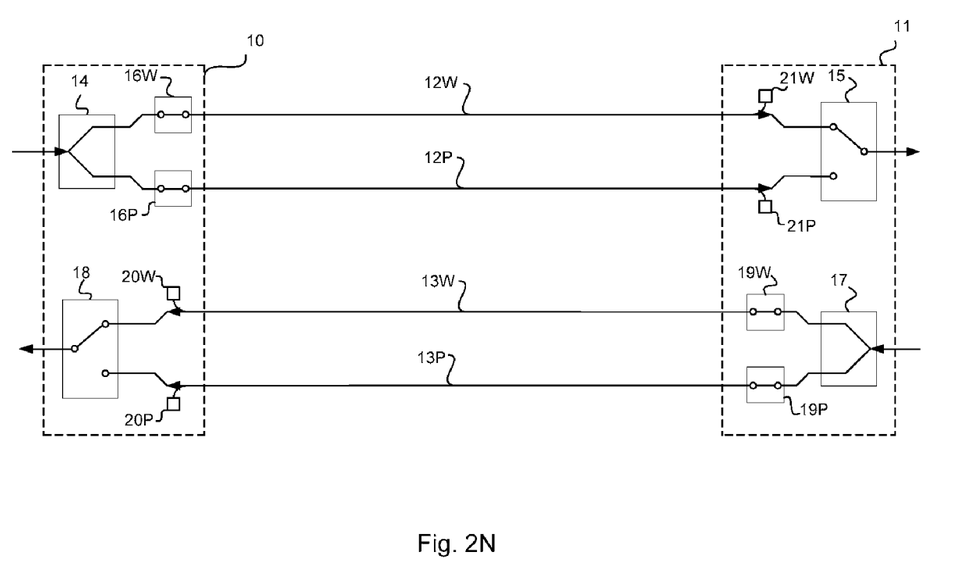

With the working optical fiber 12W repaired, after a waiting period the receiving optical switch 15 in the node 11 switches back from the protection optical fiber 12P to the working optical fiber 12W, as shown in FIG. 2M. In a similar fashion, with a waiting period expiring, the optical switch 18 in the node 10 switches back from the protection optical fiber 13P to the working optical fiber 13W, as shown in FIG. 2N. The link has reverted back to normal, its initial state before the failure on the working optical fiber 12W.

Figure 3A:
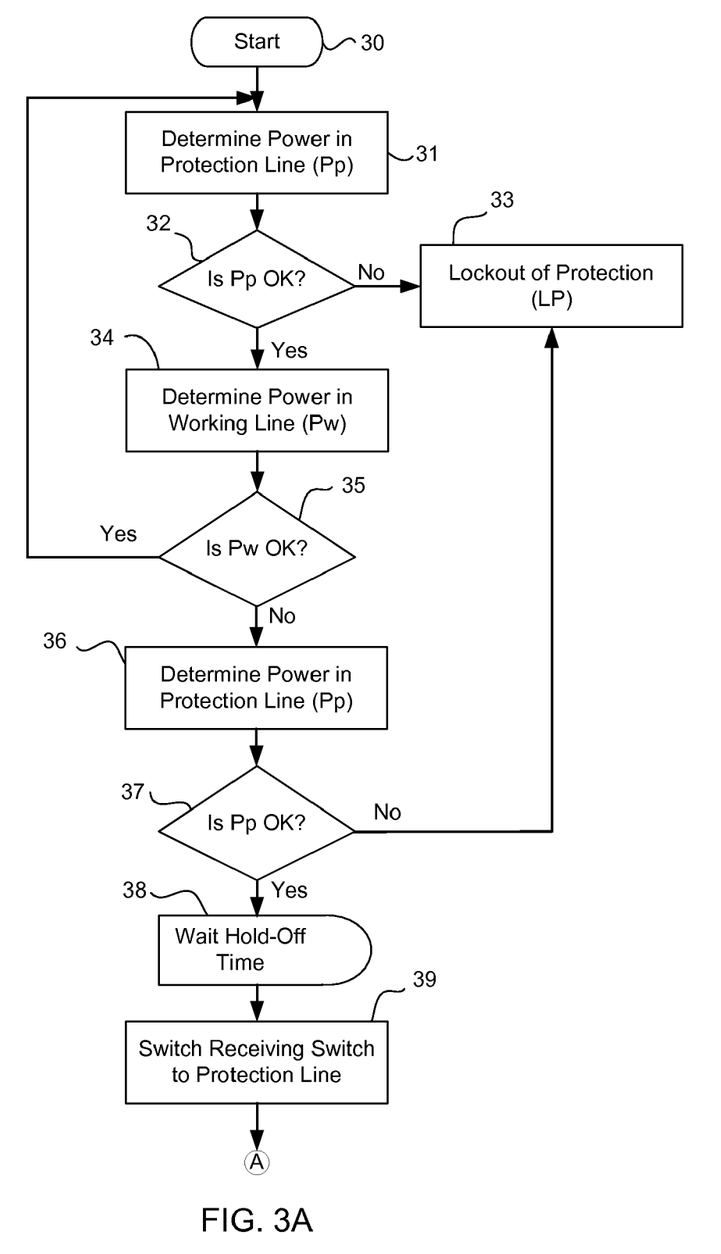
FIGS. 3A-3C show a flow chart of operations of the FIG. 1 nodes, according to an embodiment of the present invention.
Figure 3B:
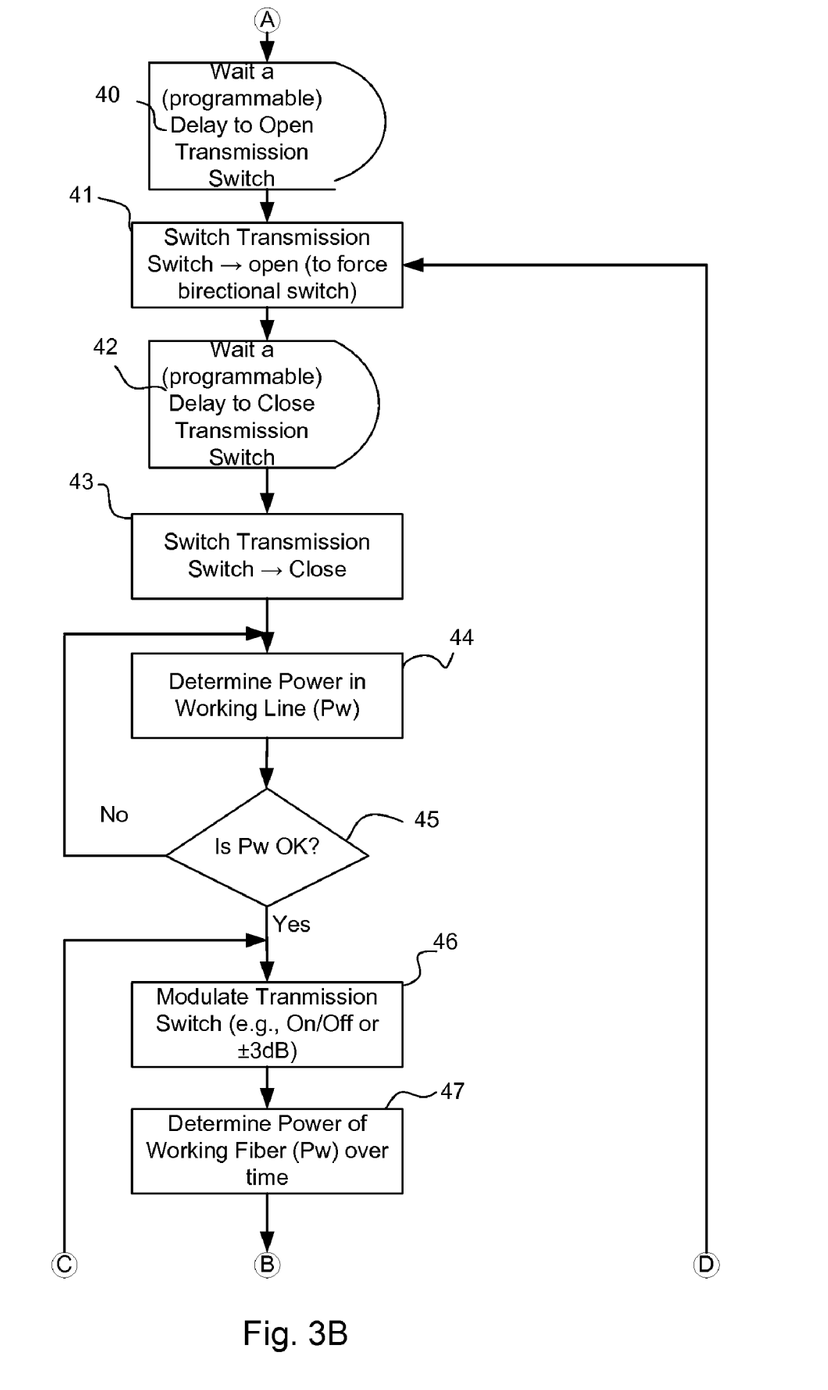
Figure 3C:
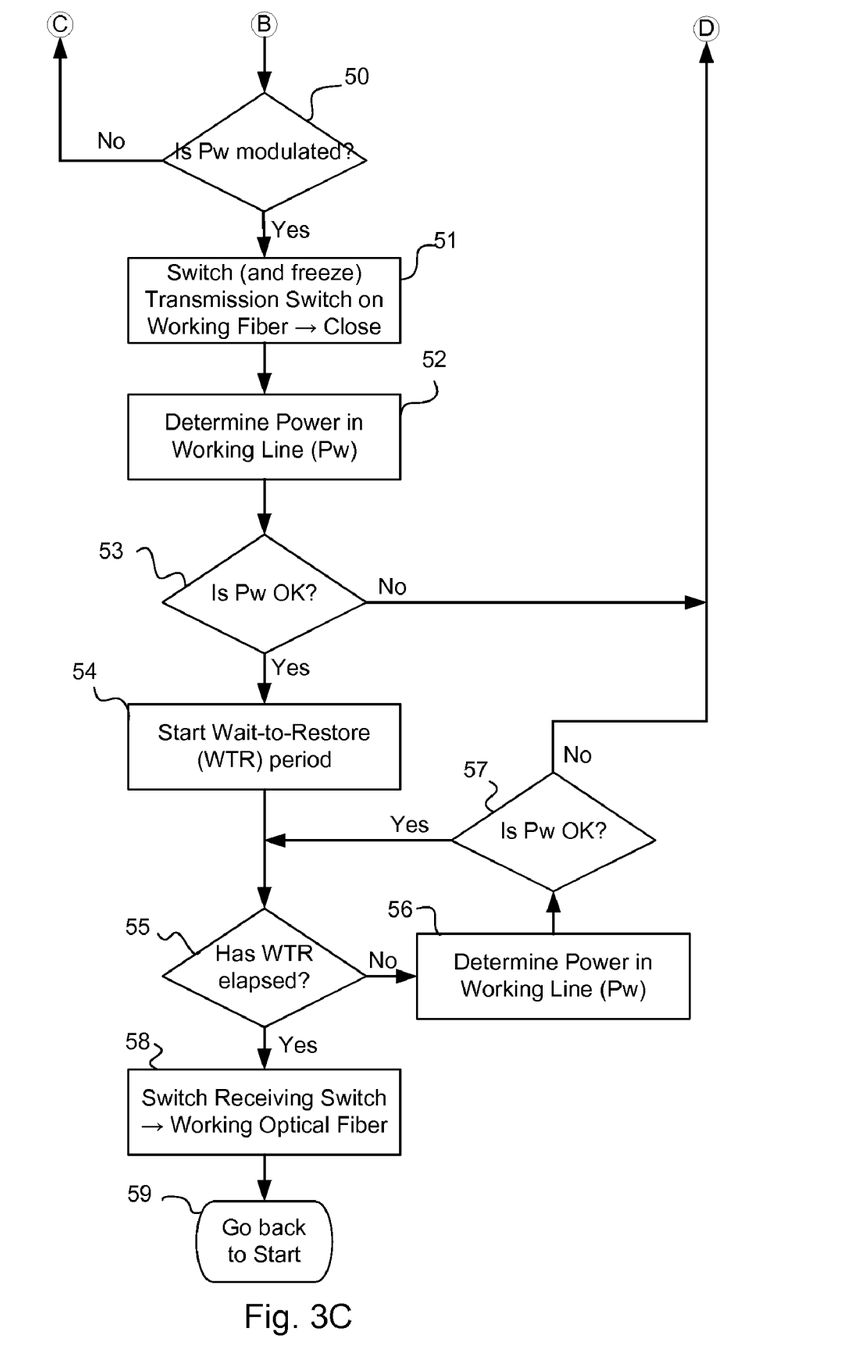

FIGS. 3A-3C illustrate by a flow chart by which the nodes of a link operate according to the present invention. In the operations of FIGS. 2A-2N, for example, both nodes 10 and 11 operate accordingly. In the description of the flow chart, the operations of the node 11 is used as an example, though node 10 works equally well.

Step 30 in FIG. 3A indicates the start of operations. Steps 31-37 check on the power of the optical signals received by the subject node, i.e., that the optical signals are being received properly over the working optical fiber and protection optical fiber. For the node 11, the working and protection optical fibers are 12W and 12P respectively. The negative responses to decision steps 32 and 37 indicate the protection optical fiber is not working and the process moves to the lockout of protection step 33. If the protection optical fiber 12P is working to provide a back-up for the working optical fiber, then upon a determination that the working optical fiber 12W is not functioning properly (step 35 and FIG. 2A), the receiving switch 15 changes the received signals from the working optical fiber 12W to the protection fiber 12P in step 39 after a predetermined hold-off time delay (step 38). See FIG. 2B.

After another programmable delay of step 40, the transmitting switch 19W connected to the working optical fiber 13W is opened by step 41. See FIG. 2C. This communicates the fault in the working optical fiber 12W to the corresponding node across the link, the node 10 and triggers the actions of the node 10 shown in FIGS. 2D and 2E. Step 42 imposes a programmable delay on the subject node 11 before the step 43 switches close the transmitting optical switch 19W for the working optical fiber 13W, illustrated in FIG. 2F. Steps 44 and 45 wait for the power in the working optical fiber 12W to return. Operations performed by the node 10 and on the working optical fiber 12W are shown in steps 2G and 2H.

Upon the power return to the working optical fiber 12W (FIG. 2I), step 46 starts the modulation of the power of the signals transmitted on transmitting working optical fiber 13W. As shown in FIG. 2J, the transmitting optical switch 19W starts toggling off and on. Alternatively, if a VOA is substituted for the switch 19W, the signal power is modulated by varying the power. In this example, the power is modulated by one-half (±3 dB). Step 47 monitors the signal power over the working optical fiber 12W at the same time. FIG. 2K.

Step 50 tests whether the power received over the working optical fiber 12W is modulated. If not, the process returns to step 46 and the transmitting optical switch 19W continues to toggle. If the power received over the working optical fiber 12W is modulated, the step 51 stops the modulating action of the transmitting switch 19W on the working optical fiber 13W and keeps the switch closed, as shown in FIG. 2L. In step 52 the node 11 checks again on the power in the receiving working optical fiber 12W and step 53 tests whether the power has returned to functioning levels. If not, the process loops back to the step 41 on FIG. 3B. If so and normal power has returned to the receiving working optical fiber 12W, step 54 starts a restoration delay period and step 55 checks whether the delay period has elapsed or not. If the delay period has not elapsed, a loop formed by steps 57 and 57 keeps checking whether the delay period has expired or not. On the other hand, if the power on the working optical fiber 12W is lost again, the process returns to step 41 on FIG. 3B. If power on the working optical fiber 12W is maintained and the delay period expires, then step 58 switches the receiving optical switch 15 to the receiving optical fiber 12W, as shown in FIG. 2M.

The node 10 operating likewise has its receiving switch 18 switch to the receiving working optical fiber 13W, as illustrated in FIG. 2N. The state of the link and its two nodes 10 and 11 are back in its initial state.

Figure 4:
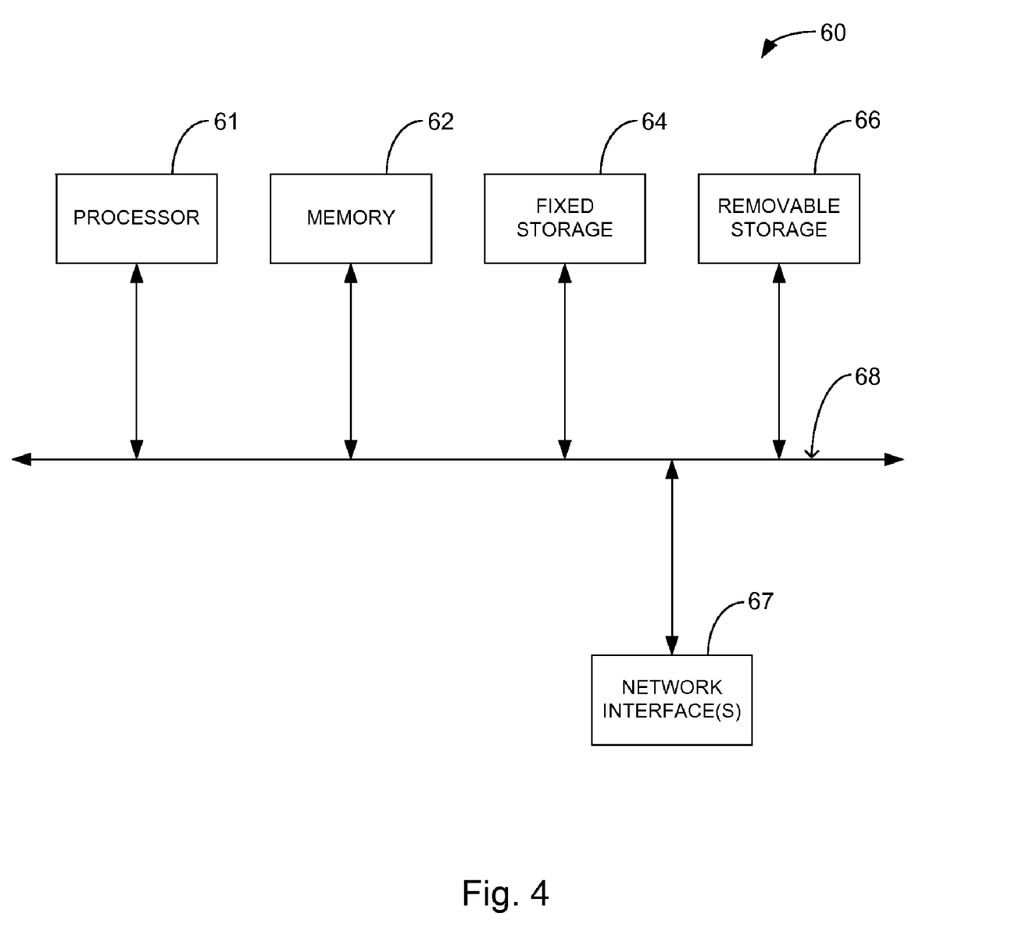
FIG. 4 illustrates a block diagram of a control block for each node according to one embodiment of the present invention.

Each node operates under a control block 60 which is illustrated in FIG. 4. The control block 60 includes a memory subsystem 62 which can store and retrieve software programs incorporating computer code that implements aspects of the invention, data for use with the invention, and the like and a central processor subsystem 61 which, among other functions, processes the instructions and data of the computer code. Example computer readable storage media for the memory 62 include semiconductor system memory preferably, CD-ROM, floppy disk, tape, flash memory, and hard drive. The control block further includes subsystems, such as fixed storage 64 (e.g., hard drive), removable storage 66 (e.g., CD-ROM drive), and one or more network interfaces 67, all connected by a system bus 68. The network interface 67 provides a pathway for the node to communicate with the network management system and each other to synchronize operations. Additional or fewer subsystems in the control block may be used. For example, the control block may include more than one processor 41 (i.e., a multi-processor system), or a cache memory.

Alternatively, rather than an independent control block 60, each node can be operated by the network management system which operates the nodes of the optical network.

From the standpoint of network architecture, the 1+1 protection procedure and system described above is performed at very low, or primary, level of operation. For example, using the often-taught and well-known OSI (Open Systems Interconnection) model, the lowest layer in the model, the physical layer, is concerned with the integrity in the transmitted bits over a communications channel. In the described embodiments of the present invention, the power of the totality of bits being transferred over all the communications channels, the wavelength channels in the case of WDM and DWDM networks, of the optical fiber link between the nodes. The particular bits or signals are not of concern. The embodiments of the present invention operate at such a low level of protocol that it could be considered below the commonly understood layers of network architecture models, or protocol-less, as evident in the description above.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. In an optical network having a link carrying optical signals in one direction and carrying optical signals in an opposite direction with 1+1 protection in each direction, each node for said link comprising:
    an optical splitter having an input terminal configured to receive optical signals to transmit across said link, a first output terminal and a second output terminal;
    a first optical modulator connected between said first optical splitter output terminal and a first terminal for connection to a first transmission optical fiber configured to carry said optical signals across said link in said one direction;
    a second optical modulator connected between said second optical splitter output terminal and a second terminal for connection to a second transmission optical fiber configured to carry said optical signals across said link in said one direction;
    a receiving optical switch having an output terminal for transmitting optical signals, a first input terminal for receiving said optical signals from a first receiving optical fiber for carrying across said link in said opposite direction, and a second input terminal configured to receive said optical signals from a second receiving optical fiber across said link in said opposite direction;
    a first photo diode coupled to said first input terminal of said receiving optical switch; and
    a second photo diode coupled to said second input terminal of said receiving optical switch;
    wherein said first and second optical modulators are configured to continuously toggle between an optical signal and a partially attenuated optical signal for transmission across said first and second transmission optical fibers.

2. The node of claim 1, wherein said first and second optical modulators and said receiving optical switch operate in response to optical signal power monitored by the first and second photodiodes to detect failure of optical signal power on said first receiving optical fiber.

3. The node of claim 2, wherein said first and second optical modulators each comprises a Variable Optical Attenuator (VOA).

4. The node of claim 2, wherein said first optical modulator is configured to cut off optical signals on said first transmission optical fiber upon said failure of optical signal power on said first receiving optical fiber.

5. The node of claim 4, wherein said first optical modulator is configured to modulate optical signal power on said first transmission optical fiber upon a recovery from said failure of optical signal power on said first receiving optical fiber.

6. The node of claim 5, wherein said first optical modulator is configured to transmit optical signals on said first transmission optical fiber upon a detection of partial power modulation of optical signal power on said first receiving optical fiber.

7. The node of claim 6, wherein said receiving optical switch is configured to switch back to said first input terminal upon a determination that optical signal power has correctly returned to said first receiving optical fiber.

8. The node of claim 1, wherein said first and second optical modulators are configured to partially attenuate said optical signal by one-half power.

9. A method of operating a local node connected to a remote node by a link with a 1+1 protection, said local node having a transmission port connected to a first transmission optical fiber and a second transmission optical fiber of said link and a reception port connected to a first receiving optical fiber and a second receiving optical fiber of said link, said method comprising:
receiving signals on said first receiving optical fiber from said remote node;
sending optical signals to said remote node on said first and second transmission optical fibers;
detecting a failure on said first receiving optical fiber;
switching to said second receiving optical fiber to receive signals from said remote node;
terminating sending signals on said first transmission optical fiber to said remote node to indicate said failure on said first receiving optical fiber; and
detecting continuously toggled partially attenuated and unattenuated optical signals across said first receiving optical fiber indicating said first receiving optical fiber has been repaired.

10. The method of claim 9, further comprising:
sending signals to said remote node on said first and second transmission optical fibers after a first predetermined delay after said terminating.

11. The method of claim 9, further comprising:
modulating signal power of an optical signal by continuously toggling an optical modulator in order to partially attenuate and not attenuate said optical signal for transmission on said first transmission optical fiber upon detecting a return of signal power on said first receiving optical.

12. The method of claim 11, further comprising:
terminating said modulating upon detecting a modulation of signal power on said first receiving optical fiber so that signals are sent to said remote node on said first and second transmission optical fibers.

13. The method of claim 12, further comprising:
determining whether said signal power on said first receiving optical fiber is functional; and
receiving signals on said first receiving optical fiber from said remote node if said signal power on said first receiving optical fiber is functional.

14. The method of claim 13, further comprising:
terminating sending signals on said first transmission optical fiber to said remote node to indicate failure on said first receiving optical fiber if said signal power on said first receiving optical fiber is not functional.

15. The method of claim 11, wherein said modulating comprises continuously toggling said signal power on said first transmitting optical fiber within an amplitude range without completely attenuating said signal power.

16. The method of claim 11, wherein modulating comprises partially attenuating said optical signal by one-half power.

17. In an optical network having a node connected to a remote node by a link with a 1+1 protection, said node having a transmission port connected to a first transmission optical fiber and a second transmission optical fiber of said link and a reception port connected to a first receiving optical fiber and a second receiving optical fiber of said link, said node comprising:
means for receiving signals on said first receiving optical fiber from said remote node;
means for sending optical signals to said remote node on said first and second transmission optical fibers;
means for detecting a failure on said first receiving optical fiber;
means for switching to said second receiving optical fiber to receive signals from said remote node;
means for terminating sending signals on said first transmission optical fiber to said remote node to indicate said failure on said first receiving optical fiber;
means for detecting continuously toggled partially attenuated and unattenuated optical signals across said first receiving optical fiber indicating that said first receiving optical fiber has been repaired;
means for sending signals to said remote node on said first and second transmission optical fibers after a first predetermined delay after operation of said terminating means; and
means for modulating signal power of an optical signal by continuously toggling between said optical signal and said optical signal that has been partially attenuated for transmission on said first transmission optical fiber upon detecting a return of signal power on said first receiving optical fiber.

18. The node of claim 17, further comprising:
means for terminating modulation of the signal power upon detecting a modulation of signal power on said first receiving optical fiber so that signals are sent to said remote node on said first and second transmission optical fibers.

* * * * *